United States Patent Office 2,697,123
Patented Dec. 14, 1954

2,697,123

POLYCHLORO-TERTIARY-BUTYL-BENZENES

Joseph Farrell Weiler, Lewiston, N. Y., assignor to Olin Mathieson Chemical Corporation, a corporation of Virginia No Drawing. Application February 9, 1950, Serial No. 143,339

6 Claims. (Cl. 260—651)

This invention relates to the production of polychlorinated aromatic compounds having particular value in insecticidal preparations of the general type described in my copending application Serial No. 645,703, filed February 5, 1946, now abandoned, but is directed to polychlorotertiary butyl benzene compounds of particular constitution and configuration. The new compounds are chlorine-bearing derivatives of monotertiary butyl benzene which contain a minimum of four chlorine atoms in the molecule. They are distinguished from other chlorine-bearing derivatives of tertiary butyl benzene in having at least two chlorine atoms in the aromatic nucleus and at least two chlorine atoms in the tertiary butyl group on an average analysis basis. For, I have found that there is a surprising increase in insecticidal activity over other chlorine-bearing tertiary butyl benzenes when the average proportion of chlorine in the molecule is increased to four atoms and a structural configuration is obtained which is characterized by the presence of at least two chlorine atoms in both the nucleus and the side chain. Thus I have synthesized a great number of chlorotertiary butyl benzene compounds ranging from simple mono-chloro-tertiary-butyl-benzenes up to polychloro derivatives averaging as high as 7 to 8 chlorine atoms in the molecule. When these compounds were tested for insecticidal activity by comparison against a commercially accepted thiocyanide insecticide of high rating known as "Lethane 384 Special." I found that the polychlorotertiary butyl benzene compounds of my invention having at least two chlorine atoms in both nucleus and chain possessed striking superiority in insecticidal capacity over other chlorotertiary butyl benzene compounds and over the reference standard as well.

For example, one group of compounds tested contained no side chain chlorine and one to four nuclear chlorine atoms. All of these materials were poorer than Lethane. Samples were prepared containing one side chain chlorine atom and none, one and two nuclear chlorine atoms but all of these materials were poorer than Lethane. Samples were prepared containing two side chain chlorine atoms and none or one chlorine atom in the nucleus. All of these materials were poorer than Lethane. Samples containing as many as three and some as many as five side chain chlorine atoms were prepared with none or one chlorine atom in the nucleus. Even these materials were also poorer than Lethane. It appears that for best results, at least about two chlorine atoms are required in the side chain, and at least about two chlorine atoms are required in the nucleus of tertiary butyl benzene in order to produce an improved insecticide. When these conditions of constitution and configuration are fulfilled, the products are all at least about half again as effective as the above powerful commercial insecticide commonly accepted as a standard of insecticidal activity.

In addition to their insecticidal properties, the new compounds are of interest as solvents and as plasticizers. For example, the compounds of the present invention are compatible with polyvinyle chloride, a material for which few known plasticizers are satisfactory. They also have the property of imparting fire-resistance to combustible polymers.

I have found that the new compounds possess unusual stability in that the side chain chlorine atoms are almost as difficultly removed as the nuclear chlorine atoms. For example, little if any chlorine is removed when these compounds are refluxed for several hours with aqueous alkaline potassium permanganate or with moist silver oxide in ether. The result is the same with alcoholic potassium hydroxide. Even chromic and nitric acids effect only incomplete oxidation. This is in striking contrast to the behavior of better known side chain chlorine-bearing aromatic compounds, for example, benzyl chloride.

I generally prepare the polychlorotertiary butyl benzene compounds from tertiary butyl benzene by direct chlorination in light, particularly when I want the product to predominate in side chain chlorine. Other methods, however, may be used. For example, the compounds may be prepared by reacting tertiary butyl benzene in the dark with sulfuryl chloride in the presence of a small amount of organic peroxide. Chlorination in light is advantageously carried out at temperatures between about 50° C. and about 150° C. Side-chain chlorination catalysts such as phosphorus trichloride may be used if desired.

Any suitable equipment may be employed but for commercial scale operation a glass column surrounded by fluorescent lighting tubes, backed by a reflecting outer jacket, is preferred. The operation may be carried out in a continuous manner by bubbling chlorine into the bottom of the column while circulating the material to be chlorinated through the column at a controlled rate. Means are provided at the top of the column for the withdrawal of the hydrogen chloride gas formed as an incident of the reaction, and the product mixture is with advantage blown with air or other inert gas to free it of residual hydrogen chloride before further processing. Such further processing may take the form of a distillation operation yielding a plurality of fractions of different chlorine content. While the polychlorotertiary butyl benzene compounds are unusually stable as compared to other compounds containing side chain chlorine, as has been previously indicated, the distillation is best effected with additions of a suitable dehydrohalogenation inhibitor such as diphenyl amine, dimethyl aniline, alpha-nitroso-beta-naphthol or the like. Adequate protection against decomposition is ordinarily obtained with about 0.1–0.2 per cent of the inhibitor, based on the weight of the material being distilled.

Where a compound having more than two nuclear chlorine atoms is desired, the chlorination is carried out with advantage in two stages, the aromatic nucleus is chlorinated in the first stage, and the tertiary butyl side-chain is chlorinated in the second. In ring chlorination with elemental chlorine, the use of catalyst such as ferric chloride or antimony chloride is generally advantageous.

My invention is further illustrated by the following examples. The compounds described were tested insecticidally by comparison with a commercially available thiocyanide insecticide known as "Lethane 384 Special" by preparing 5 per cent solutions of this standard and the sample to be tested in a highly refined kerosene known as "Ultrasene." The test is performed using a spherical screen cage containing about 15 flies. The cage is rotated slowly during the introduction of the insecticidal solution by spraying and the dead flies are counted the next day.

Example I

Tertiary butyl benzene was chlorinated in the ring and then in the side chain until analysis showed that about 5 chlorine atoms had been taken up in the ring and an average of about 4 chlorine atoms by the side chain. In the ring chlorination elemental chlorine was passed through 526.5 grams of tertiary butyl benzene to which had been added 5 grams of antimony trichloride. When the mixture had gained 488 grams in weight, it was washed first with dilute hydrochloric acid, then with water and finally with sodium carbonate solution. Thereafter it was dried and passed through a column of activated alumina to improve the color.

A charge of 778 grams of the ring chlorinated tertiary butyl benzene after further decolorizing treatment was light chlorinated at 80° to 120° C. using phosphorus trichloride as catalyst until the weight had increased 506.5 grams. The phosphorus trichloride was then removed by blowing with nitrogen for 16 hours at 110° C.

A 5 per cent solution of the product in Ultrasene gave a kill of 90.7 per cent flies under conditions where 5 per cent Lethane in Ultrasene gave a kill of only 56.2 per cent. The Lethane rating was thus 34.5. The comparison may also be expressed as the ratio of the kill with the polychlorotertiary butyl benzene compared to that with the Lethane. In this case, it can be seen that the polychlorotertiary butyl benzene was about 1.6 times as effective as the standard.

*Example II*

Tertiary butyl benzene was chlorinated in the dark until the product contained 33.68 per cent of chlorine. It was washed with dilute caustic solution and water, dried and chlorinated in light until it contained a total of 59.72 per cent chlorine. The resulting product, after being washed and dried, contained approximately 2 chlorine atoms in the nucleus and 4 chlorine atoms in the side chain.

A 5 per cent solution of the material of this example in Ultrasene showed a kill of 95.5 per cent compared with a kill by 5 per cent Lethane in Ultrasene of only 38.0 per cent. The material of this example was therefore about 2.5 times as effective as the Lethane.

*Example III*

Tertiary butyl benzene was chlorinated as described in Example II until it contained about 3.3 chlorine atoms in the nucleus and 3.6 chlorine atoms in the side chain. Tested as described, it showed a kill of 80.5 per cent compared with 38.0 per cent for Lethane. This material was therefore 2.12 times as effective as Lethane.

*Example IV*

Tertiary butyl benzene was chlorinated as described in Example II until it contained about four side chain chlorine atoms and two nuclear chlorine atoms. When tested as described above, it showed a kill of 60.0 per cent compared with 38.0 per cent for Lethane and was thus 1.6 times as effective.

*Example V*

Tertiary butyl benzene (498.5 gms.) was chlorinated in the presence of light for 54.5 hours by which time the rate of chlorination had slackened considerably. The gain in weight was 799.5 gms. corresponding to the introduction of 6.2 atoms of chlorine into the tertiary butyl benzene. Analysis showed 62.6 per cent of total chlorine and 47.6 per cent of chlorine in the side chain, corresponding to about 1.5 chlorine atoms in the ring and 4.5 chlorine atoms in the side chain.

The insecticidal property of this material was compared with that of Lethane. Five per cent of the latter in Ultrasene gave a kill of 47.5 per cent (house flies) while 5 per cent of the polychlorotertiary butyl benzene in the same solvent gave a kill of 68.4 per cent for a rating of plus 20.9 over the Lethane. The product of this example was about 1.4 times as effective as Lethane.

*Example VI*

Tertiary butyl-3,4-dichlorobenzene, obtained by the Friedel-Crafts alkylation of orthodichlorobenzene with tertiary butyl chloride, was chlorinated in the light as described in Example V until it contained an amount of chlorine equivalent to a total of 5.4 chlorine atoms per molecule. The product was an amber colored liquid having a refractive index of $N_D^{25} = 1.6040$. The side chain chlorine content was equivalent to about 3.4 chlorine atoms per molecule.

When a 5 per cent solution of this product in Ultrasene was tested against a 5 per cent Ultrasene solution of Lethane in the manner previously described, it showed a rating of plus 36.5, the kill amounting to 92.7 per cent, compared with 56.2 per cent for the Lethane. This material is therefore 1.64 times as effective as the Lethane.

*Example VII*

A charge of 2404.5 gms. of tertiary butyl-3,4-dichlorobenzene, obtained by the Friedel-Crafts alkylation of ortho-dichlorobenzene with tertiary butyl chloride, was chlorinated in light at 80° C. and the product was fractionated at 3 mm. A fraction boiling at 124° C. and having a refractive index of 1.5542 corresponded in composition to a monochloro tertiary butyl dichlorobenzene. A further fraction boiling at 142° C. at 3 mm. and having a refractive index of 1.5663 represented a dichloro tertiary butyl dichlorobenzene. Tested in Ultrasene, the latter product was found to be 2.32 times as effective as the Lethane.

*Example VIII*

In the preparation of the product of Example VII a first fraction was obtained boiling at 124° C. and having a refractive index of 1.5542. This material contained only 1 side chain chlorine atom and 2 nuclear chlorine atoms. A charge of 1125.8 gms. of this material was further chlorinated at 120° C. until it had gained 385 gms. in weight. It had then a refractive index of 1.5855 and contained two side chain chlorine atoms and two nuclear chlorine atoms. When tested as described above, it showed a kill of 91.0 per cent compared with 56.2 per cent for Lethane. The product of this example was therefore 1.61 times as effective as the Lethane.

*Example IX*

A charge of 2103 gms. of tertiary butyl dichlorobenzene, obtained by the treatment of ortho-dichlorobenzene with tertiary butyl chloride and aluminum chloride, was chlorinated in light at 80–90° C. until the weight had increased 860 gms. The product was fractionally distilled under reduced pressure and three fractions were obtained. The first boiled at 129.5° C. at 3.5 mm. and had a refractive index of 1.5630–45. Analysis showed that it contained only about 1.5 side chain chlorine atoms and insecticidal tests showed that it was no better an insecticide than Lethane.

A second fraction was obtained boiling at 145.5°–148.5° C. at 3.5 mm. having a refractive index of 1.5700–32. This material showed a kill in 5 per cent Ultrasene solution of 85.0 per cent compared with a kill by Lethane under similar conditions of 41.1 per cent. The product was therefore 2.07 times as effective as Lethane.

The third fraction boiled at 148°–155° C. at 2.5 mm. and had a refractive index of 1.5790–97. Similarly tested it showed a kill of 95.5 per cent compared with 41.1 per cent by Lethane. This sample was, therefore, 2.33 times as effective as the Lethane.

*Example X*

Commercial mixed trichlorobenzenes were alkylated with tertiary butyl chloride and aluminum chloride and a charge of 967.5 gms. of the distilled tertiary butyl trichlorobenzene fraction was chlorinated in light at 90° C. until the product contained 2.5 side chain chlorine atoms and 3 nuclear chlorine atoms. The product was water-white and when tested as described above, showed a kill of 77.5 per cent compared with 41.1 per cent for Lethane. This product was therefore 1.89 times as effective as the Lethane. The commercial mixed trichlorobenzenes are essentially a mixture of 1,2,3-trichlorobenzene and 1,2,4-trichlorobenzene, predominating in the latter. See "Industrial Solvents" by Mellan, Reinhold, N. Y., 1st edition (1939), page 194; and 2nd edition (1950), pages 365–366.

I claim:

1. A reaction product of mixed polychlorotertiary butyl benzenes which contain on an average basis from 4 to about 9 chlorine atoms in the polychlorotertiary butyl benzene molecule which has on an average basis at least two chlorine atoms in the aromatic nucleus and at least two chlorine atoms in the tertiary butyl group, said reaction product being produced through side chain light chlorination at a temperature from about 50° to about 150° C. of a nuclear chloro-substituted tertiary butyl benzene having on an average basis at least two chlorine atoms in the aromatic nucleus, said nuclear chloro-substituted tertiary butyl benzene being selected from the group consisting of the products of nuclear chlororination of tertiary butyl benzene and the products of Friedel-Crafts alkylation of ortho-dichlorobenzene.

2. A reaction product of mixed polychlorotertiary butyl benzenes which contain on an average basis 4 chlorine atoms in the polychlorotertiary butyl benzene molecule which has on an average basis 2 chlorine atoms in the aromatic nucleus and 2 chlorine atoms in the tertiary butyl group, said reaction product being produced through side chain light chlorination at a temperature from about 50° to about 150° C. of a nuclear chloro-substituted tertiary butyl benzene having on an average basis two chlorine atoms in the aromatic nucleus, said nuclear chloro-substituted tertiary butyl benzene being the product of nuclear chlorination of tertiary butyl benzene.

3. A reaction product of mixed polychlorotertiary butyl benzenes which contain on an average basis 4 chlorine atoms in the polychlorotertiary butyl benzene molecule which has on an average basis 2 chlorine atoms in the aromatic nucleus and 2 chlorine atoms in the tertiary butyl group, said reaction product being produced through side chain light chlorination at a temperature from about 50° to about 150° C. of a nuclear chloro-substituted tertiary butyl benzene having on an average basis two chlorine atoms in the aromatic nucleus, said nuclear chloro-substituted tertiary butyl benzene being the product of Friedel-Crafts alkylation of ortho-dichlorobenzene.

4. A reaction product of mixed polychlorotertiary butyl benzenes which contain on an average basis 6 chlorine atoms in the polychlorotertiary butyl benzene molecule which has on an average basis 2 chlorine atoms in the aromatic nucleus and 4 chlorine atoms in the tertiary butyl group, said reaction product being produced through side chain light chlorination at a temperature from about 50° to 150° C. of a nuclear chloro-substituted tertiary butyl benzene having on an average basis two chlorine atoms in the aromatic nucleus, said nuclear chloro-substituted tertiary butyl benzene being the product of nuclear chlorination of tertiary butyl benzene.

5. A reaction product of mixed polychlorotertiary butyl benzenes which contain on an average basis 6 chlorine atoms in the polychlorotertiary butyl benzene molecule which has on an average basis 2 chlorine atoms in the aromatic nucleus and 4 chlorine atoms in the tertiary butyl group, said reaction product being produced through side chain light chlorination at a temperature from about 50° to 150° C. of a nuclear chloro-substituted tertiary butyl benzene having on an average basis two chlorine atoms in the aromatic nucleus, said nuclear chloro-substituted tertiary butyl benzene being the product of Friedel-Crafts alkylation of ortho-dichlorobenzene.

6. A reaction product of mixed polychlorotertiary butyl benzenes which contain on an average basis 9 chlorine atoms in the polychlorotertiary butyl benzene molecule which has 5 chlorine atoms in the aromatic nucleus and 4 chlorine atoms in the tertiary butyl group, said reaction product being produced through side chain light chlorination at a temperature from about 50° to about 150° C. of a nuclear chloro-substituted tertiary butyl benzene having five chlorine atoms in the aromatic nucleus, said nuclear chloro-substituted tertiary butyl benzene being the product of nuclear chlorination of tertiary butyl benzene.

References Cited in the file of this patent

UNITED STATES PATENTS

| Number | Name | Date |
|---|---|---|
| 2,430,822 | Nevison | Nov. 11, 1947 |

OTHER REFERENCES

Kharasch et al.: "Jour. Am. Chem. Soc.," vol. 61, pp. 2142–50 (1939).

Acree et al.: "Jour. Org. Chem.," vol. 4, pp. 572–3 (1939).

De La Mare et al.: "Chemical Society Journal," pp. 279–81 (1943), London.

Truce et al.: "Jour. Am. Chem. Soc.," vol. 71, pp. 752–3 (1949).